United States Patent [19]

Ohsato et al.

[11] Patent Number: 5,168,487
[45] Date of Patent: Dec. 1, 1992

[54] OPTICAL RECORDING AND/OR REPRODUCING APPARATUS

[75] Inventors: Kiyoshi Ohsato, Chiba; Toshiki Udagawa, Tokyo; Hitoshi Okada, Chiba, all of Japan

[73] Assignee: Sony Corporation, Tokyo, Japan

[21] Appl. No.: 555,628

[22] Filed: Jul. 23, 1990

[30] Foreign Application Priority Data

Jul. 24, 1989 [JP] Japan .................................. 1-190881

[51] Int. Cl.$^5$ ............................................... G11B 7/09
[52] U.S. Cl. ............................. 369/44.37; 369/44.28; 369/44.41
[58] Field of Search ............... 369/44.37, 44.38, 44.41, 369/44.32, 32, 44.14, 58, 44.28, 44.29, 44.11, 124, 44.27, 44.42

[56] References Cited

U.S. PATENT DOCUMENTS 4,722,079  1/1988  Matsumoto .
4,775,968  10/1988  Ohsato .......................... 369/44.41

FOREIGN PATENT DOCUMENTS 0162702  11/1985  European Pat. Off. .
0268321   5/1988  European Pat. Off. .
0372953   6/1990  European Pat. Off. .
63-160022  7/1988  Japan .

Primary Examiner—Roy N. Envail, Jr.
Assistant Examiner—Muhammad Edun
Attorney, Agent, or Firm—Hill, Van Santen, Steadman & Simpson

[57] ABSTRACT

An optical recording and/or reproducing apparatus comprising a light beam generator, a photodetector, an optical path forming device for causing a light beam from the light beam generator to impinge upon an optical disc and for guiding the light beam emanating from the optical disc to the photodector, and a signal generating circuit block operative to obtain based on a detection output obtained from the photodetector a first signal representing a tracking condition of the light beam in relation to a record track portion on the optical disc and a second signal different in phase by substantially ninety degrees from the first signal and to produce a tracking error signal which satisfies the following equation:

$$St = S1/\{K \cdot (S1^2 + S2^2)^{\frac{1}{2}} + S2\}$$

where St stands for the tracking error signal, S1 stands for the first signal, S2 stands for the second signal and K stands for a constant equal to or more than 1.

8 Claims, 5 Drawing Sheets

OPTICAL RECORDING AND/OR REPRODUCING APPARATUS

BACKGROUND OF THE INVENTION

1. Field of the Invention

The present invention relates generally to optical recording and/or reproducing apparatus, and more particularly, is directed to improvements in an apparatus operative to cause a light beam or light beams to impinge upon a disc-shaped record medium for recording information thereon or reproducing information therefrom.

2. Description of the Prior Art

In an optical disc player for optically recording an information signal on or optically reproducing an information signal from an optical disc-shaped record medium having a center hole and a recording area on which a spiral record track is composed to surround the center hole, an optical head device is provided for constituting an optical arrangement for causing a light beam to impinge upon the recording area of the optical disc-shaped record medium rotating with a rotation center disposed at the center hole so as to form the spiral record track corresponding to a recording information signal on the recording area or to read an information signal recorded in the spiral record track on the recording area.

In the optical head device, for example, a laser light beam produced by a light beam generating portion is collimated by a collimator lens and enters into an objective lens to be focused thereby to impinge upon the optical disc-shaped record medium, and then a reflected light beam emanating from the optical disc-shaped record medium is directed through the objective lens to a beam splitter to be changed in a direction of its optical axis thereby so as to enter into a photodetecting portion. A reproduced information signal, a focus error signal and a tracking error signal are produced based on a detection output of the reflected light beam from the photodetecting portion, and a focus servocontrol operation for maintain correct focus of the light beam projected onto the optical disc-shaped record medium and a tracking servocontrol operation for maintain the light beam in correct tracking relation to each turn of the spiral record track on the optical disc-shaped record medium are performed in accordance with the focus error signal and the tracking error signal, respectively.

As for the production of the tracking error signal, various signal producing systems including the so-called "three-beam system" have been known. In the so-called "three-beam system", a light beam produced by a light beam generating portion is divided into a main light beam and a pair of auxiliary light beams and the main and auxiliary light beams are caused to impinge upon an optical disc-shaped record medium in such a manner that a pair of light beam spots formed on the optical disc-shaped record medium by the auxiliary light beams are positioned in a relation of point symmetry to a light beam spot formed on the optical disc-shaped record medium by the main light beam and two reflected auxiliary light beams emanating from the optical disc-shaped record medium are detected by separate photodetectors, respectively. Detection outputs obtained from the photodetectors by which two reflected auxiliary light beams are detected, respectively, are substantially equal to each other when the main light beam is correctly incident upon a spiral record track on the optical disc-shaped record medium and different from each other when the main light beam is incident upon the optical disc-shaped record medium in an incorrect tracking relation to the spiral record track. Therefore, a tracking error signal is obtained based on a difference between the detection outputs obtained from the photodetectors by which two reflected auxiliary light beams are detected, respectively.

The tracking error signal thus obtained in accordance with the so-called "three-beam system" is formed into a sine-wave signal having a period corresponding to a track pitch defined as a distance between centers of two adjacent turns of the spiral record track on the optical disc-shaped record medium under a condition wherein the light beams incident upon the optical disc-shaped record medium are moved to transverse each turn of the spiral record track. In tracking servocontrol performed with the tracking error signal obtained to have a sinusoidal waveform in accordance with, for example, the so-called "three-beam system", an effective servocontrol range is determined based on a portion of the sinusoidal waveform of the tracking error signal, which varies in substantially linear with a cross point to a DC level between negative and positive peak points of the tracking error signal, and therefore there is a disadvantage that the main light beam incident upon the optical disc-shaped record medium can be maintained in correct tracking relation to the spiral record track only in a relatively narrow effective servocontrol range.

OBJECTS AND SUMMARY OF THE INVENTION

Accordingly, it is an object of the present invention to provide an optical recording and/or reproducing apparatus in which a light beams is caused to impinge upon an optical disc-shaped record medium for recording information thereon or reproducing information therefrom and a tracking error signal is produced based on a detection output obtained from a photodetector by which the light beam emanating from the optical disc-shaped record medium is detected, and which avoids the aforementioned disadvantage encountered with the prior art.

Another object of the present invention is to provide an optical recording and/or reproducing apparatus in which a light beam is caused to impinge upon an optical disc-shaped record medium for recording information thereon or reproducing information therefrom and a tracking error signal is produced based on a detection output obtained from a photodetector by which the light beam emanating from the optical disc-shaped record medium is detected, and by which the tracking error signal can be formed so as to cause an effective servocontrol range to extend efficaciously in a tracking servocontrol to which the tracking error signal is applied.

According to the present invention, there is provided an optical recording and/or reproducing apparatus comprising a light beam generator for producing a light beam, a photodetecting device for detecting a light beam, an optical path forming device for causing the light beam produced by the light beam generator to impinge upon an optical disc-shaped record medium and for guiding the light beam emanating from the disc-shaped record medium to the photodetecting device, and a signal generating circuit block operative to obtain based on a detection output obtained from the photodetecting device a first signal representing a tracking condition of the light beam in relation to a record track portion on the optical disc-shaped record medium and a second signal different in phase by substantially ninety degrees from the first signal and to produce a tracking error signal which satisfies the following equation:

$$St = S1/\{K \cdot (S1^2 + S2^2)^{\frac{1}{2}} + S2\}$$

where St stands for the tracking error signal, S1 stands for the first signal, S2 stands for the second signal and K stands for a constant equal to or more than 1.

In the optical recording and/or reproducing apparatus thus constituted in accordance with the present invention, the tracking error signal is provided with a waveform which is transformed to approach to a sawtoothed waveform having a period corresponding to a track pitch on the optical disc-shaped record medium in response to increase of the constant K so as to have an extended portion thereof varying substantially linear with a cross point to a DC level between negative and positive peak points. Since an effective servocontrol range in the tracking servocontrol to which the tracking error signal produced in accordance with the present invention is applied is determined based on the above-mentioned extended portion of the waveform, the light beam incident upon the optical disc-shaped record medium can be stably maintained in correct tracking relation to a record track on the optical disc-shaped record medium in a relatively wide effective servocontrol range in the tracking servocontrol to which the tracking error signal produced in accordance with the present invention is applied.

The above and other objects, features and advantages of the present invention will become apparent from the following detailed description which is to be read in conjunction with the accompanying drawings.

DESCRIPTION OF THE PREFERRED EMBODIMENT

Figure 1:
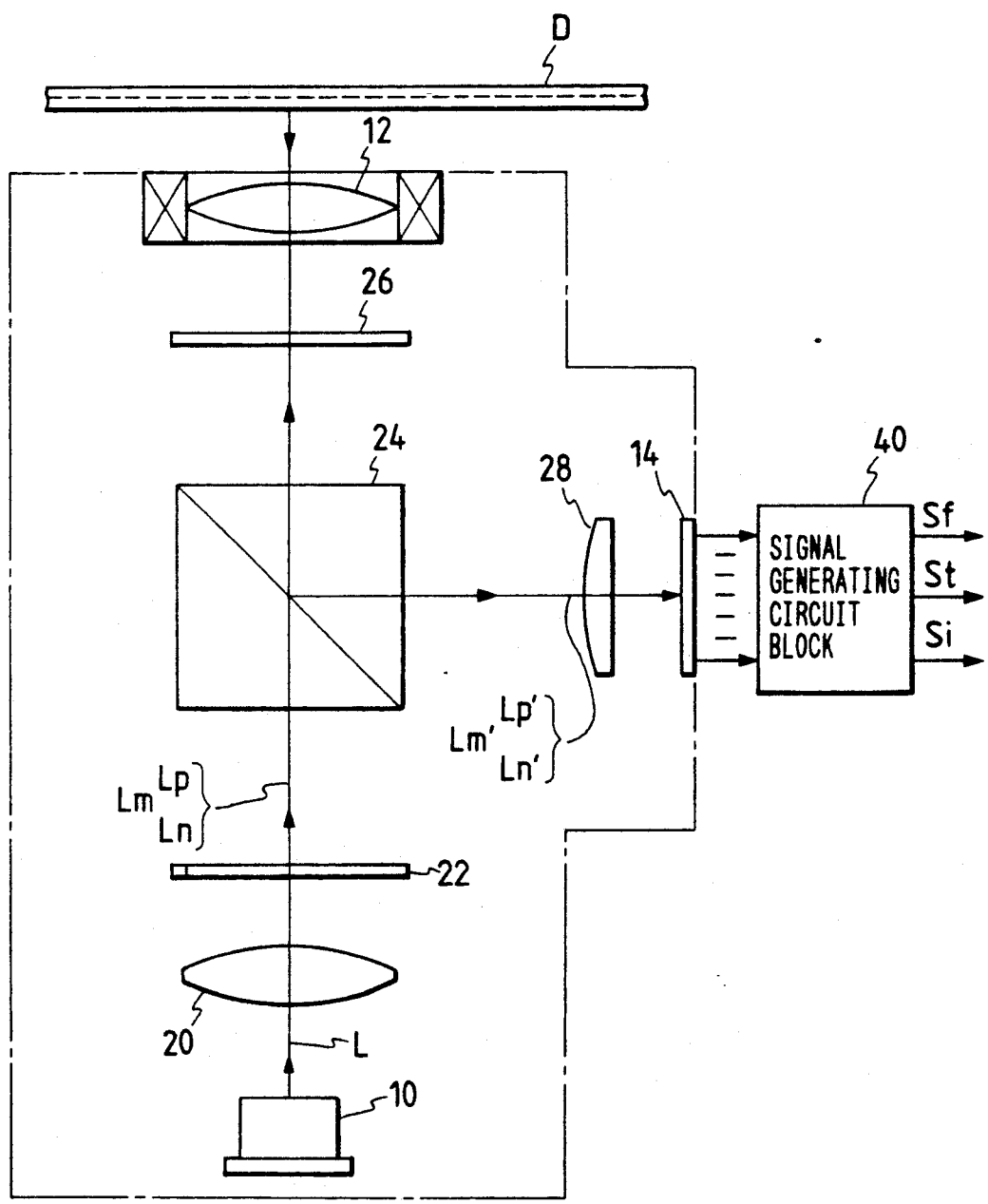
FIG. 1 is a schematic illustration showing an essential part of one embodiment of optical recording and or reproducing apparatus according to the present invention.

FIG. 1 shows schematically an optical unit and a signal generating circuit block which forms essential parts of an embodiment of optical recording and/or reproducing apparatus according to the present invention. The essential pars of the embodiment shown in FIG. 1 constitutes an information reproducing system applied to, for example, an optical disc player, in which the optical unit comprises a semiconductor laser device 10 for generating a laser light beam L, an objective lens 12 and a photodetector 14 and is provided to be able to move in a radial direction of a disc D which is an optical disc-shaped record medium.

The laser light beam L generated by the semiconductor laser device 10 is collimated by a collimator lens 20 and then enters into a grating 22. In the grating 22, the laser light beam L is divided into three light beams including a center beam and first and second side beams positioned at both sides of the center beam. The center beam serves as main light beam Lm and the first and second side beams serve as auxiliary light beams Lp and Ln, respectively. For the sake of simple illustration, these main and auxiliary light beams Lm, Lp and Ln are shown with a single line in FIG. 1. Then, each of the main light beam Lm and the auxiliary light beams Lp and Ln obtained from the grating 22 passes through a polarized beam splitter 24 without changing the direction of its optical axis and then through a ¼-wave plate 26 to the objective lens 12 and is focused by the objective lens 12 to impinge upon the disc D.

Figure 2:
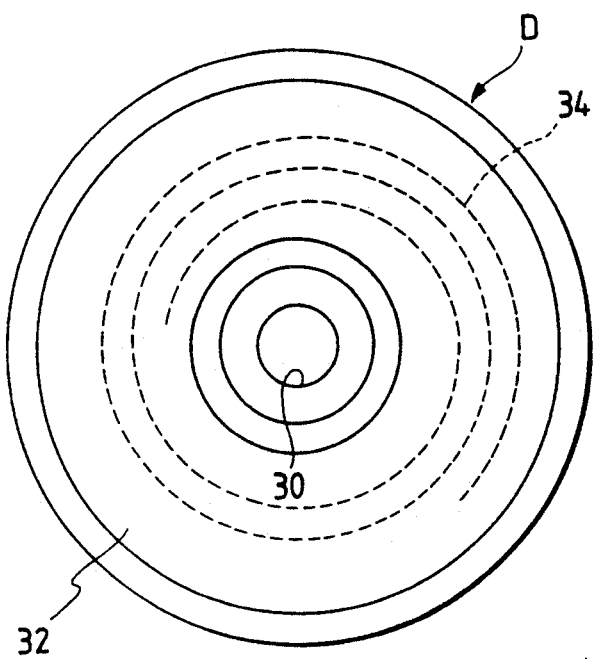
FIG. 2 is a schematic plane view showing an example of an optical disc used in the embodiment shown in FIG. 1.

As shown in FIG. 2, the disc D is provided with a center hole 30 and an information recording area 32 around the center hole 30. On the information recording area 32, a spiral guide groove 34 is previously formed to surround the center hole 30 and a spiral record track is to be formed along the spiral guide groove 34. The spiral record track is to have a track pitch (a distance between centers of two adjacent turns of the spiral record track) of, for example, about 1.6 μm and each turn of the spiral record track is defined to be one track for convenience's sake.

The main light beam Lm and the auxiliary light beams Lp and Ln incident upon the disc D are modulated in intensity by the spiral guide groove 34 or the spiral record track and reflected to be a reflected main light beam Lm' and reflected auxiliary light beams Lp' and Ln'. Each of the reflected main light beam Lm' and reflected auxiliary light beams Lp' and Ln' from the disc D passes through the objective lens 12 and the ¼-wave plate 26 to the polarized beam splitter 24. Then, each of the reflected main light beam Lm' and reflected auxiliary light beams Lp' and Ln' is deflected at the polarized beam splitter 24 so as to pass to the photodetector 14 through a receiving lens 28.

Figure 3:
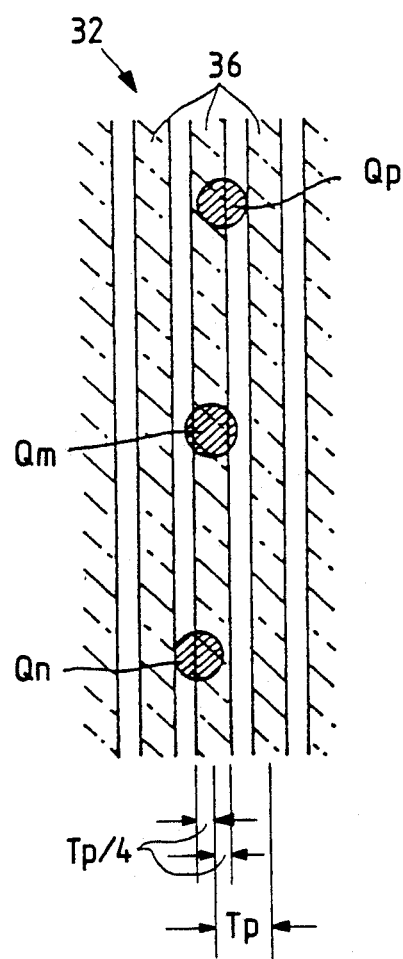
FIG. 3 is a schematic illustration showing light beam spots formed on an optical disc by main and auxiliary light beams in the embodiment shown in FIG. 1.

The objective lens 12, polarized beam splitter 24, ¼-wave plate 26 and the receiving lens 28 inclusive constitute an optical path forming device which is operative to cause the main light beam Lm and the auxiliary light beams Lp and Ln obtained from the grating 22 to impinge upon the disc D and to guide the reflected main light beam Lm' and reflected auxiliary light beams Lp' and Ln' emanating from the disc D to the photodetector 14. The optical path forming device is adjusted to position the main light beam Lm and the auxiliary light beams Lp and Ln each focused by the objective lens 12 to impinge upon the disc D in such a manner that, as shown in FIG. 3, in the information recording area of the disc D, a main light beam spot Qm is formed by the main light beam Lm on a spiral record track 36 and a pair of auxiliary light beam spots Qp and Qn are formed by the auxiliary light beams Lp and Ln, respectively, to be disposed with the main light beam spot Qm between, the auxiliary light beam spots Qp and Qn are respectively distant substantially the same distance from the main light beam spot Qm so as to be positioned in a relation of point symmetry to the main light beam spot Qm, and the main light beam spot Qm and each of the auxiliary light beam spots Qp and Qn have a space therebetween in the radial direction of the disc D, which corresponds to ¼ times as long as a track pitch Tp of the spiral record track 36 on the disc D, namely, a quarter of a track pitch Tp/4 so that one of the auxiliary light beam spots Qp and Qn is positioned to be outer than the main light beam spot Qm on the disc D and the other of the auxiliary light beam spots Qp and Qn is positioned to be inner than the main light beam spot Qm on the disc D.

The photodetector 14 upon which each of the reflected main light beam Lm' and reflected auxiliary light beams Lp' and Ln' is incident is provided with a first photodetecting element for detecting the reflected main light beam Lm', a second photodetecting element for detecting the reflected auxiliary light beam Lp', and a third photodetecting element for detecting the reflected auxiliary light beam Ln'. Detection output signals obtained from the first, second and third photodetecting elements of the photodetector 14 are supplied to a signal generating circuit block 40 to produce a reproduced information signal Si, a focus error signal Sf and a tracking error signal St.

Figure 4:
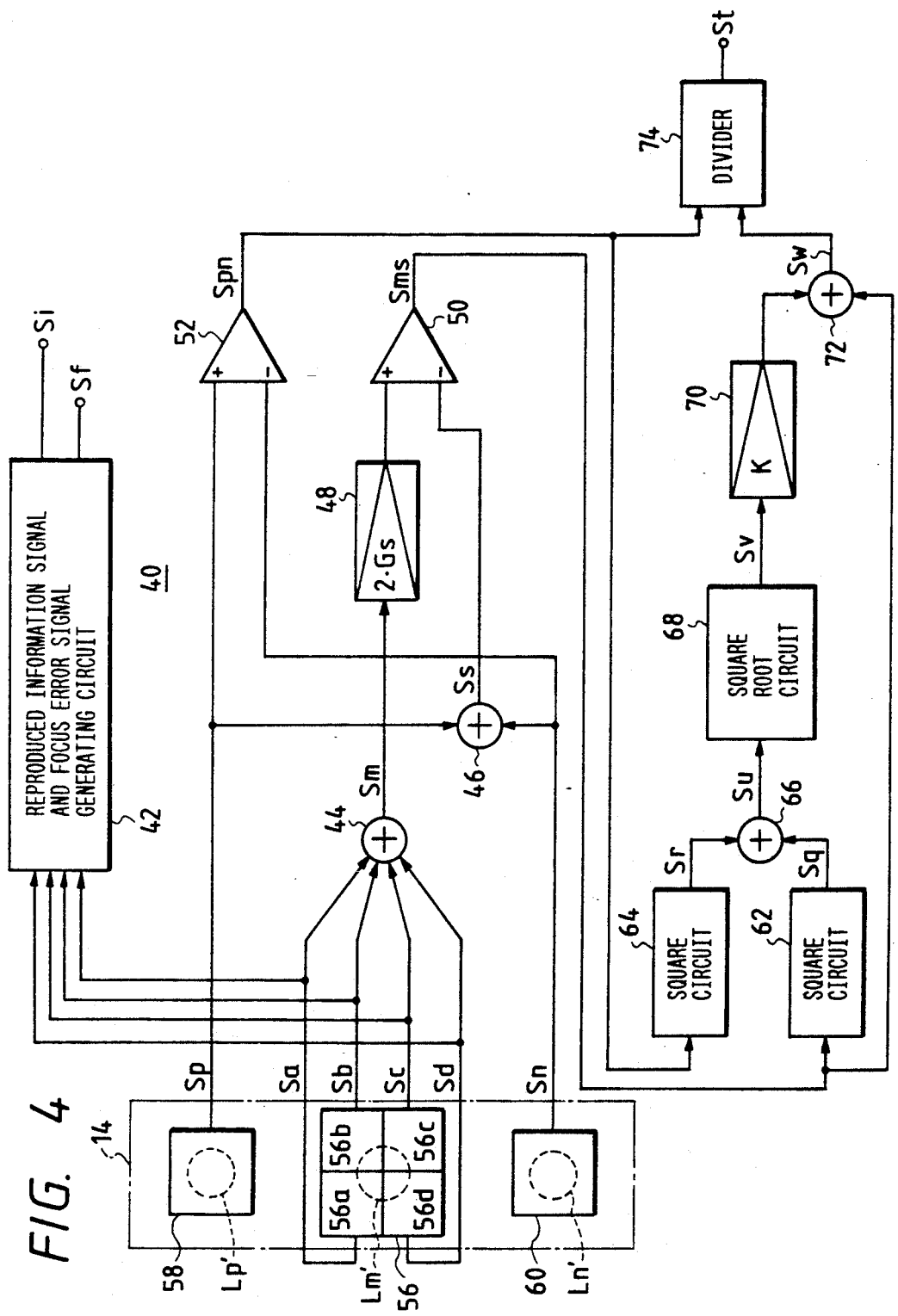
FIG. 4 is a schematic circuit diagram showing an example of an arrangement including a photodetector and a signal generating circuit, which can be applied to the embodiment shown in FIG. 1.

FIG. 4 shows one example of an embodied configuration including the photodetector 14 and the signal generating circuit block 40 which can be applied to the embodiment shown in FIG. 1.

Referring to FIG. 4, the photodetector 14 comprises a photodetecting element 56 for detecting the reflected main light beam Lm' as the first photodetecting element, which is divided into four parts 56a, 56b, 56c and 56d disposed close to one another, a photodetecting element 58 for detecting the reflected auxiliary light beam Lp' as the second photodetecting element, and a photodetecting element 60 for detecting the reflected auxiliary light beam Ln' as the third photodetecting element.

Detection output signals Sa, Sb, Sc and Sd obtained from the parts 56a, 56b, 56c and 56d of the photodetecting element 56, respectively, are supplied to a reproduced information signal and focus error signal generating circuit 42 constituting a part of the signal generating circuit block 40. In the reproduced information signal and focus error signal generating circuit 42, the reproduced information signal Si and the focus error signal Sf are separately produced based on the detection output signals Sa, Sb, Sc and Sd to be delivered.

Further, in the signal generating circuit block 40, the detection output signals Sa, Sb, Sc and Sd are added one another in an adder 44 to produce an added signal Sm (=Sa+Sb+Sc+Sd). In addition, detection output signals Sp and Sn obtained from the photodetecting elements 58 and 60, respectively, are added to each other in an adder 46 to produce an added signal Ss (=Sp+Sn).

The added signal Sm obtained from the adder 44 is supplied to a level controller 48 to be subjected therein to level adjustment with a gain of 2 Gs and then supplied to one of input terminals of a subtracter 50. The added signal Ss obtained from the adder 46 is directly supplied to the other of input terminals of the subtracter 50. The gain 2·Gs in the level controller 48 is set in response to a ratio in intensity Gs of each of the auxiliary light beams Lp and Ln to the main light beam Lm.

From the subtracter 50, a difference signal Sms (=2·Gs·Sm−Ss) which corresponds to a level difference between the added signal Sm having adjusted in level with the gain of 2 Gs and the added signal Ss is obtained to be supplied to a square circuit 62 and to one of input terminals of an adder 72.

The detection output signals Sp and Sn obtained from the photodetecting elements 58 and 60, respectively, are supplied to a subtracter 52 and a difference signal Spn (=Sp−Sn) which corresponds to a level difference between the detection output signals Sp and Sn is obtained from the subtracter 52 to be supplied to a square circuit 64 and to one of input terminals of a divider 74.

A signal Sq (=Sms$^2$) is obtained by squaring the difference signal Sms from the square circuit 62 and a signal Sr (=Spn$^2$) is obtained by squaring the difference signal Spn from the square circuit 64. The signals Sq and Sr are added to each other in an adder 66 to produce an added signal Su (=Sms$^2$+Spn$^2$). The added signal Su is supplied to a square root circuit 68. From the square root circuit 68, a signal Sv $\{=(Sms^2+Spn^2)^{\frac{1}{2}}\}$ is obtained by making square root of the added signal Su. The signal Sv is supplied to a level controller 70 so be subjected therein to level adjustment with a gain of K and then supplied to the other of input terminals of the adder 72. The gain K in the level controller 70 is set to be equal to or more than 1.

In the adder 72, the difference signal Sms from the subtracter 50 is added to the signal Sv having adjusted in level with the gain K in the level controller 70 and thereby an added signal Sw $\{=K·(Sms^2+Spn^2)^{\frac{1}{2}}+Sms\}$ is obtained to be supplied to the other of input terminals of the divider 74. Then, a signal representing a ratio (Spn/Sw) of the difference signal Spn to the added signal Sw is derived from the divider 74 to be the tracking signal St.

In such a case, supposing $I_0$ stands for the intensity of the main light beam Lm, $I_1$ stands for the intensity of each of the auxiliary light beams Lp and Ln, U stands for the displacement of the main light beam Lm from the center of the spiral record track 36 in the radial direction of the disc D, since, in the information recording area 32 of the disc D, one of the auxiliary light beam spots Qp and Qn is distant by a distance corresponding to Tp/4 from the main light beam spot Qm toward the outer fringe of the disc D and the other of the auxiliary light beam spots Qp and Qn is distant by the distance corresponding to Tp/4 from the main light beam spot Qm toward the inner fringe of the disc D, the following equations are satisfied.

$$Sm = Sa + Sb + Sc + Sd$$
$$= I_0\{a · \cos(2\pi U/Tp) + b\}$$

$$Sp = I_1[a · \cos\{2\pi(U + Tp/4)/Tp\} + b]$$
$$= I_1\{-a · \sin(2\pi U/Tp) + b\}$$

$$Sn = I_1[a · \cos\{2\pi(U - Tp/4)/Tp\} + b]$$
$$= I_1\{a · \sin(2\pi U/Tp) + b\}$$

where a stands for amplitude and b stands for a DC offset component.

Since the equation: $Gs = I_1/I_0$ is satisfied, the following equations are further satisfied.

$$Sms = 2 \cdot Gs \cdot Sm - Ss \quad (1)$$
$$= 2 \cdot Gs \cdot Sm - (Sp + Sn)$$
$$= 2 \cdot I_1\{a \cdot \sin(2\pi U/Tp) + b\} - 2 \cdot I_1 \cdot b$$
$$= 2 \cdot I_1 \cdot a \cdot \cos(2\pi U/Tp)$$

$$Spn = Sp - Sn \quad (2)$$
$$= 2 \cdot I_1 \cdot a \cdot \sin(2\pi U/Tp)$$

The added signal Sw from the adder 72 is expressed with the following equation:

$$Sw = K \cdot (Sms^2 + Spn^2)^{\frac{1}{2}} + Sms$$

Substituting the right side of the equation (1) for Sms and the right side of the equation (2) for Spn, the following equations are further satisfied:

$$Sw = k \cdot [(2 \cdot I_1 \cdot a)^2 \cdot \{\cos^2(2\pi U/Tp) + \sin^2(2\pi U/Tp)\}]^{\frac{1}{2}} + 2 \cdot I_1 \cdot a \cdot \cos(2\pi U/Tp)$$
$$= 2 \cdot I_1 \cdot a \cdot \{K + \cos(2\pi U/Tp)\}$$

As a result, the tracking error signal St is expressed with the following equation:

$$St = Spn/Sw$$
$$= \sin(2\pi U/Tp)/\{K + \cos(2\pi U/Tp)\}.$$

Accordingly, the tracking error signal St obtained from the divider 74 does not include the DC offset component and has a constant amplitude regardless of the amplitude of each of the added signal Sm, the detection output signal Sp from the photodetecting element 58 and the detection output signal Sn from the photodetecting element 60, the intensity $I_0$ of the main light beam Lm, and the intensity Il of each of the auxiliary light beams Lp and Ln.

Figure 5A:
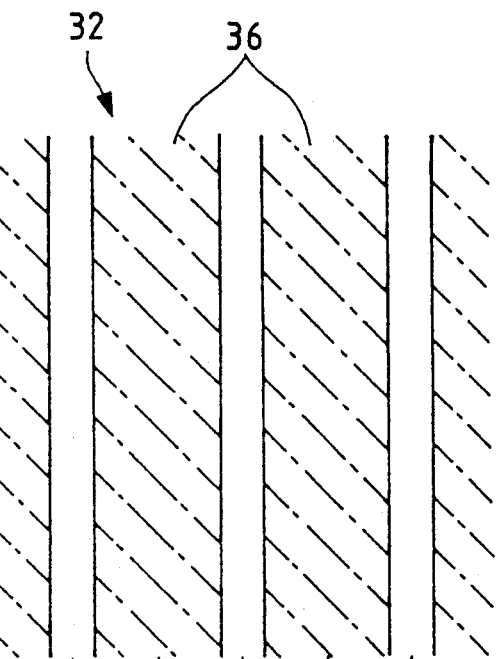
FIGS. 5A and 5B are illustrations used for explaining a tracking error signal produced by the signal generating circuit shown in FIG. 4.
Figure 5B:
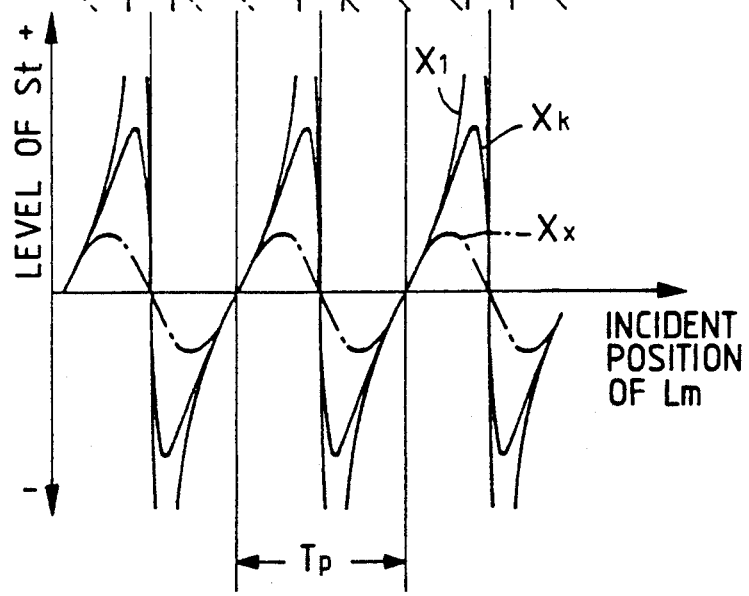

In the case where the constant K is selected to be 1, the tracking error signal St is expressed with the equation: $St = \tan(2\pi U/2Tp)$ and therefore the tracking error signal St has such a waveform as shown with a solid line $X_1$ in FIG. 5B when the main light beam Lm is moved to traverse the spiral record tracks 36 formed in the information recording area 32 of the disc D as shown in FIG. 5A. Further, in the case where the constant K is selected to be larger than 1, the tracking error signal St has such a waveform as shown with a solid line Xk in FIG. 5B when the main light beam Lm is moved to traverse the spiral record tracks 36 formed in the information recording area 32 of the disc D as shown in FIG. 5A.

If the tracking error signal St were constituted by the difference signal Spn obtained from the subtracter 52 to be expressed with the equation: $St = 2 \cdot I_1 \cdot a \cdot \sin(2\pi U/Tp)$, it has a sinusoidal waveform as shown with a dot-dash line Xx in FIG. 5B when the main light beam Lm is moved to traverse the spiral record tracks 36 formed in the information recording area 32 of the disc D as shown in FIG. 5A.

As described above, the tracking error signal St obtained from the divider 74 is provided with the waveform which is transformed to approach to a saw-toothed waveform having a period corresponding to the track pitch Tp on the disc D, compared with the sinusoidal waveform, with the constant K selected to be equal to or more than 1, so as to have an extended portion thereof varying substantially linear with a cross point to a DC level between negative and positive peak points. Since an effective servocontrol range in the tracking servocontrol to which the tracking error signal St is applied is determined based on the above-mentioned extended portion of the waveform, the main light beam Lm incident upon the disc D can be stably maintained in correct tracking relation to the spiral record track 36 on the disc D in a relatively wide effective servocontrol range in the tracking servocontrol to which the tracking error signal St is applied.

Figure 6:
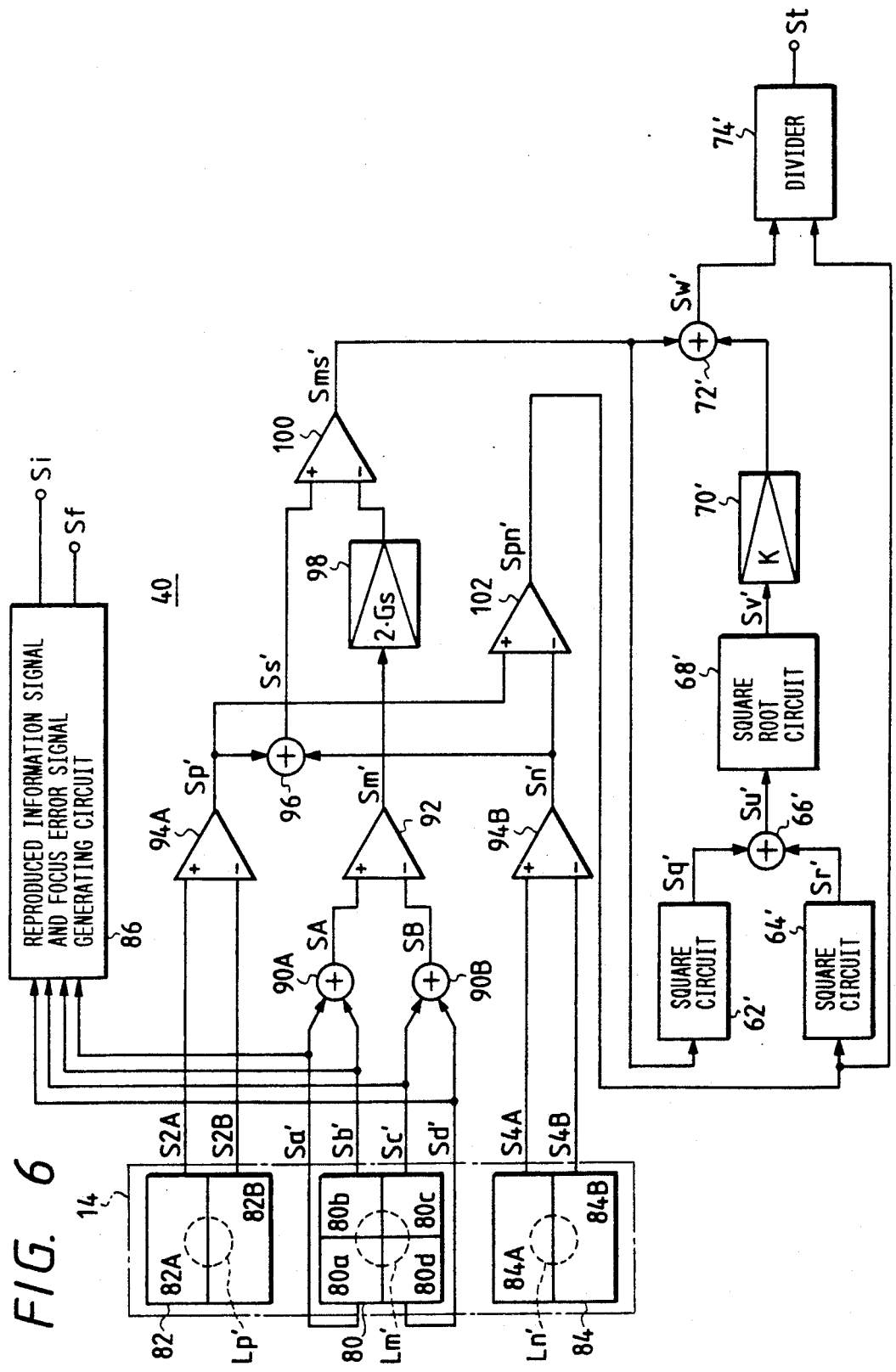
FIG. 6 is a schematic circuit diagram showing another example of the arrangement including the photodetector and the signal generating circuit, which can be applied to the embodiment shown in FIG. 1.

FIG. 6 shows another example of the embodied configuration including the photodetector 14 and the signal generating circuit block 40 which can be applied to the embodiment shown in FIG. 1.

Referring to FIG. 6, the photodetector 14 comprises a photodetecting element 80 for detecting the reflected main light beam Lm' as the first photodetecting element, which is divided into four parts 80a, 80b, 80c and 80d disposed close to one another, a photodetecting element 82 for detecting the reflected auxiliary light beam Lp' as the second photodetecting element, which is divided into two parts 82A and 82B, and a photodetecting element 84 for detecting the reflected auxiliary light beam Ln' as the third photodetecting element, which is divided into two parts 84A and 84B.

Detection output signals Sa', Sb', Sc' and Sd' obtained from the parts 80a, 80b, 80c and 80d of the photodetecting element 80, respectively, are supplied to a reproduced information signal and focus error signal generating circuit 86 constituting a part of the signal generating circuit block 40. In the reproduced information signal and focus error signal generating circuit 86, the reproduced information signal Si and the focus error signal Sf are separately produced based on the detection output signals Sa', Sb', Sc' and Sd' to be delivered.

Further, in the signal generating circuit block 40, the detection output signals Sa' and Sb' are added to each other in an adder 90A to produce an added signal SA (=Sa'+Sb'), and the detection output signals Sc' and Sd' are also added to each other in an adder 90B to produce an added signal SB (=Sc'+Sd'). The added signals SA and SB are substantially equivalent to detection output signals obtained from first and second detecting parts, respectively, if the photodetecting element 80 were divided into the first detecting part which corresponds to the parts 80a and 80b combined with each other and the second detecting part which corresponds to the parts 80c and 80d combined with each other.

Then, the added signals SA and SB are supplied to a subtractor 92 to produce a difference signal Sm' (=SA−SB) corresponding to a level difference between the added signals SA and SB.

Detection output signals S2A and S2B obtained from the parts 82A and 82B of the photodetecting element 82, respectively, are supplied to a subtracter 94A to produce a difference signal Sp' (=S2A−S2B) corresponding to a level difference between the detection output signals S2A and S2B, and detection output signals S4A and S4B obtained from the parts 84A and 84B of the photodetecting element 84, respectively, are supplied to a subtracter 94B to produce a difference signal Sn' (=S4A−S4B) corresponding to a level difference between the detection output signals S4A and S4B. The difference signals Sp' and Sn' are supplied to an adder 96 to produce an added signal Ss' (=Sp'+Sn').

The added signal Ss' from the adder 96 is directly supplied to one of input terminals of a subtracter 100. The difference signal Sm' from the subtracter 92 is supplied to a level controller 98 to be subjected therein to level adjustment with a gain of 2·Gs and then supplied to the other of input terminals of the subtracter 100. The gain 2·Gs in the level controller 98 is set in response to the ratio in intensity Gs of each of the auxiliary light beams Lp and Ln to the main light beam Lm. From the subtracter 100, a difference signal Sms' (=Ss'−2·Gs·Sm') which corresponds to a level difference between the added signal Ss' from the adder 96 and the difference signal Sm' having adjusted in level with the gain of 2·Gs from the level controller 98 is obtained to be supplied to a square circuit 62' and to one of input terminals of an adder 72'.

The difference signals Sp' from the subtracter 94A and the difference signal Sn' from the subtracter 94B are supplied to a subtracter 102 and a difference signal Spn' (=Sp'−Sn') which corresponds to a level difference between the difference signals Sp' and Sn' is obtained from the subtracter 102 to be supplied to a square circuit 64' and to one of input terminals of a divider 74'.

A signal Sq' (=Sms'²) is obtained by squaring a difference signal Sms' from the square circuit 62' and a signal Sr' (=Spn'²) is obtained by squaring a difference signal Spn' from the square circuit 64'. The signals Sq' and Sr' are added to each other in an adder 66' to produce an added signal Su' (=Sms'²+Spn'²). The added signal Su' is supplied to a square root circuit 68'. From the square root circuit 68', a signal Sv' {=(Sms'²+Spn'²)^½} is obtained by making square root of the added signal Su'. The signal Sv' is supplied to a level controller 70' so be subjected totherein to level adjustment with a gain of K and then supplied to the other of input terminals of the adder 72'. The gain K in the level controller 70' is set to be equal to or more than 1.

In the adder 72', the difference signal Sms' from the subtracter 100 is added to the signal Sv' having adjusted in level with the gain K in the level controller 70' and thereby an added signal Sw' {=K·(Sms'²+Spn'²)^½+Sms'} is obtained to be supplied to the other of input terminals of the divider 74'. Then, a signal representing a ratio (Spn'/Sw') of the difference signal Spn' to the added signal Sw' is derived from the divider 74' to be the tracking signal St.

In such a case, the following equations are satisfied.

$$Sm' = SA - SB$$
$$= I_0\{a \cdot \sin(2\pi U/Tp) + b\}$$

$$Sp' = S2A - S2B$$
$$= I_1[a \cdot \sin\{2\pi(U + Tp/4)/Tp\} + b]$$
$$= I_1\{-a \cdot \cos(2\pi U/Tp) + b\}$$

$$Sn' = S4A - S4B$$
$$= I_1[a \cdot \sin\{2\pi(U - Tp/4)/Tp\} + b]$$
$$= I_1\{a \cdot \cos(2\pi U/Tp) + b\}$$

Since the equation: $Gs = I_1/I_0$ is satisfied, the following equations are further satisfied.

$$Sms' = 2 \cdot Gs \cdot Sm' - (Sp' + Sn') \quad (3)$$
$$= 2 \cdot I_1\{a \cdot \cos(2\pi U/Tp) + b\} - 2 \cdot I_1 \cdot b$$
$$= 2 I_1 \cdot a \cdot \sin(2\pi U/Tp)$$

$$Spn' = Sp' - Sn' \quad (4)$$
$$= 2 \cdot I_1 \cdot a \cdot \cos(2\pi U/Tp)$$

The added signal Sw' from the adder 72' is expressed with the following equation:

$$Sw' = K \cdot (Sms'^2 + Spn'^2)^{\frac{1}{2}} + Sms'$$

Substituting the right side of the equation (3) for Sms' and the right side of the equation (4) for Spn', the following equations are further satisfied:

$$Sw' = k \cdot [(2 \cdot I_1 \cdot a)^2 \cdot \{\cos^2(2\pi U/Tp) + \sin^2(2\pi U/Tp)\}]^{\frac{1}{2}} + 2 \cdot I_1 \cdot a \cdot \cos(2\pi U/Tp)$$
$$= 2 \cdot I_1 \cdot a \cdot \{K + \cos(2\pi U/Tp)\}$$

As a result, the tracking error signal St is expressed with the following equation:

$$St = Spn'/Sw'$$
$$= \sin(2\pi U/Tp)/\{K + \cos(2\pi U/Tp)\}$$

Accordingly, the tracking error signal St obtained from the divider 74' does not include the DC offset component and has a constant amplitude regardless of the amplitude of each of the added signals SA and SB, the detection output signals S2A and S2B from the photodetecting element 82 and the detection output signals S4A and S4B from the photodetecting element 84, the intensity $I_0$ of the main light beam Lm, and the intensity $I_1$ of each of the auxiliary light beams Lp and Ln, in the same manner as the tracking error signal St obtained by the example shown in FIG. 4.

Although each example of the optical unit and the signal generating circuit block of the aforementioned embodiment constitutes the information reproducing system applied to, for example, the optical disc player, it is to be understood that the present invention can be also applied to an optical unit and a signal generating circuit block which constitute an information recording system applied to, for example, the optical disc player, in which a main light beam and a plurality of auxiliary light beams are caused to impinge upon an optical disc-shaped record medium for recording thereon information signals and, after reflected by the optical disc-shaped record medium, used for producing a focus error signal and a tracking error signal.

What is claimed is:

1. An optical recording and/or reproducing apparatus comprising:
light beam generating means for producing a light beam,
photodetecting means for detecting a light beam,
optical path forming means for causing the light beam produced by said light beam generating means to impinge upon an optical disc-shaped record medium and for guiding the light beam emanating from the optical disc-shaped record medium to said photodetecting means, and signal generating circuit means operative to obtain based on a detection output obtained from said photodetecting means a first signal representing a tracking condition of the light beam impinging upon the optical disc-shaped record medium in relation to a record track portion on the optical disc-shaped record medium and a second signal different in phase by substantially ninety degrees from said first signal and to produce a tracking error signal which satisfies the following equation:

$$St = S1/\{K \cdot (S1^2 + S2^2)^{\frac{1}{2}} + S2\}$$

where St stands for the tracking error signal, S1 stands for the first signal, S2 stands for the second signal and K stands for a constant equal to or more than 1.

2. An optical recording and/or reproducing apparatus according to claim 1, wherein said optical path forming means includes light beam dividing means for dividing the light beam produced by said light beam generating means into three light beams including a main light beam and two auxiliary light beams and is arranged to cause the main light beam and two auxiliary light beams to impinge upon the optical disc-shaped record medium in such a manner that a main light beam spot formed on the optical disc-shaped record medium by the main light beam is positioned between auxiliary light beam spots formed on the optical disc-shaped record medium respectively by two auxiliary light beams so that one of the auxiliary light beam spots is distant from the main light beam spot toward an outer fringe of the optical disc-shaped record medium and the other of the auxiliary light beam spots is distant from the main light beam spot toward an inner fringe of the optical disc-shaped record medium.

3. An optical recording and/or reproducing apparatus according to claim 2, wherein said optical path forming means is arranged to position said main and auxiliary light beam spots on the optical disc-shaped record medium in such a manner that the auxiliary light beam spots are respectively distant from the main light beam spot with a predetermined space therebetween in a radial direction of the optical disc-shaped record medium.

4. An optical recording and/or reproducing apparatus according to claim 3, wherein said optical path forming means is so arranged as to cause said predetermined space between each of the auxiliary light beam spots and the main light beam spot to correspond to a quarter of a track pitch on the optical disc-shaped record medium.

5. An optical recording and/or reproducing apparatus according to claim 2, wherein said photodetecting means comprises a first photodetecting element for detecting the main light beam emanating from the optical disc-shaped record medium and second and third photodetecting elements for detecting respectively the auxiliary light beams emanating from the optical disc-shaped record medium, and said signal generating circuit means comprises first signal producing means for producing said first signal based on detection outputs obtained respectively from said second and third photodetecting elements and second signal producing means for producing said second signal based on detection outputs obtained respectively from said first, second and third photodetecting elements.

6. An optical recording and/or reproducing apparatus according to claim 5, wherein said second signal producing means is operative to produce said second signal based on said first signal and the detection output obtained from said first photodetecting element.

7. An optical recording and/or reproducing apparatus according to claim 5, wherein said signal generating circuit means further comprises means for obtaining a ratio of said first signal to said second signal to produce said tracking error signal.

8. An optical recording and/or reproducing apparatus comprising:

light beam generating means for producing a light beam, photodetecting means for detecting a light beam, optical path forming means for causing the light beam produced by said light beam generating means to impinge upon an optical disc-shaped record medium and for guiding the light beam emanating from the optical disc-shaped record medium to said photodetecting means, signal generating circuit means operative to obtain, based on a detection output obtained from said photodetecting means, a first signal representing a tracking condition of the light beam impinging upon the optical disc-shaped record medium in relation to a record track portion on the optical disc-shaped record medium and a second signal different in phase by substantially ninety degrees from said first signal and to produce a tracking error signal which satisfies the following equation:

$$St = S1/\{K \cdot (S1^2 + S2^2)^{\frac{1}{2}} + S2\}$$

where St stands for the tracking error signal, S1 stands for the first signal, S2 stands for the second signal and K stands for a constant equal to or more than 1, wherein said optical path forming means includes light beam dividing means for dividing the light beam produced by said light beam generating means into three light beams including a main light beam and two auxiliary light beams and is arranged to cause the main light beam and two auxiliary light beams to impinge upon the optical disc-shaped record medium in such a manner that a main light beam spot formed on the optical disc-shaped record medium by the main light beam is positioned between auxiliary light beam spots formed on the optical disc-shaped record medium respectively by two auxiliary light beams so that one of the auxiliary light beam spots is distant from the main light beam spot toward an outer fringe of the optical disc-shaped record medium and the other of the auxiliary light beam spots is distant from the main light beam spot toward an inner fringe of the optical disc-shaped record medium, wherein said photodetecting means comprises a fist photodetecting element for detecting the main light beam emanating from the optical disc-shaped record medium and second and third photodetecting elements for detecting respectively the auxiliary light beams emanating from the optical disc-shaped record medium, and said signal generating circuit means comprises first signal producing means for producing said first signal based on detection of outputs obtained respectively from said second and third photodetecting elements and second signal producing means for producing said second signal based on detection of outputs obtained respectively from said first, second and third photodetecting elements, and wherein said first signal producing means comprises first subtracting circuit means for producing said first signal based on a difference in level between the detection outputs obtained respectively from the second and third photodetecting elements, and said second signal producing means comprises first adding circuit means for producing a first added signal by adding the detection outputs obtained respectively from the second and third photodetecting elements with each other, second subtracting circuit means for producing a difference signal based on a difference in level between said first added signal and the detection output obtained form the first photodetecting element, first square circuit means for producing a first squared signal by squaring said first signal obtained from said first signal producing circuit means, second square circuit means for producing a second squared signal by squaring said difference signal, second adding circuit means for producing a second added signal by adding said first and second squared signals with each other, square root circuit means for producing a signal based on a square root of said second added signal, and third adding circuit means for producing said second signal by adding said signal obtained from the square root circuit means and said first signal with each other.

* * * * *